United States Patent [19]
Buijs et al.

[11] Patent Number: 6,026,000
[45] Date of Patent: Feb. 15, 2000

[54] SINGLE TRANSFORMER POWER SUPPLY WITH TWO SEPARATED INPUTS AND MULTIPLE OUTPUTS

[75] Inventors: John C. Buijs, Aalsmeer; Jan de Weerd, Huizen, both of Netherlands

[73] Assignee: Lucent Technologies Inc., Murray Hill, N.J.

[21] Appl. No.: 09/098,871

[22] Filed: Jun. 17, 1998

[51] Int. Cl.[7] .................................................. H02M 3/335
[52] U.S. Cl. ................................................. 363/21; 363/97
[58] Field of Search ................................ 363/18–21, 37, 363/95, 97, 131, 132

[56] References Cited

U.S. PATENT DOCUMENTS

| | | | |
|---|---|---|---|
| 4,189,764 | 2/1980 | Synder | 363/21 |
| 5,341,279 | 8/1994 | Yamada | 363/21 |
| 5,455,757 | 10/1995 | Nguyen et al. | 363/21 |
| 5,742,491 | 4/1998 | Bowman et al. | 363/21 |
| 5,764,500 | 6/1998 | Matos | 363/132 |

*Primary Examiner*—Adolf Deneke Berhane

[57] ABSTRACT

A power supply and a method of supplying power to, for example, an optical network. In one embodiment, the power supply includes: (1) a transformer having a main power primary winding, an auxiliary power winding and a secondary winding, (2) a first controllable switch coupled to said main power primary winding that, in response to a first control signal, configures said main power primary winding to receive main DC power, (3) a second controllable switch coupled to said auxiliary power winding that, in response to a second control signal, configures said auxiliary power winding to receive auxiliary DC power and (4) an integrated controller, coupled to said secondary winding, that controls said first and second controllable switches in a current mode and as a function of a voltage of said secondary winding and a presence of said main DC power.

20 Claims, 2 Drawing Sheets

SINGLE TRANSFORMER POWER SUPPLY WITH TWO SEPARATED INPUTS AND MULTIPLE OUTPUTS

TECHNICAL FIELD OF THE INVENTION

The present invention is directed, in general, to power supplies and, more specifically, to a battery backed-up power supply, having more than one output, that provides power suitable for use in an optical network.

BACKGROUND OF THE INVENTION

Power converters commonly used in optical networks convert AC or DC input power to DC output(s) frequently have multiple outputs that are often derived from multiple transformers within the converters. In converters employing multiple transformers, DC power is commonly derived as a first stage converts commercial AC power into DC power by using an AC/DC converter. Once converted, the power is manipulated in a second stage by a DC/DC converter. This secondary conversion further conditions the power resulting in multiple voltage outputs. Such outputs commonly include voltage values of +5 V, +3.3 V, −48 V and a variable return voltage.

Additionally, typical power converters include a battery backup stage that operates as an alternate power source when commercial AC power fails. The battery is coupled to both the AC/DC stage and the DC/DC stage. During normal operation, when commercial AC power is online, the battery operates in a charging mode, where the AC/DC converter supplies power to maintain the charge. When AC power fails, the battery switches to a discharge mode to supply power to the optical network.

A major disadvantage to such a power converter is the conversion inefficiencies encountered. When power is converted, whether AC/DC or DC/DC, inefficiencies arise to reduce the quality of the output. Where two converters are employed, the conversion inefficiencies are compounded, resulting in unacceptable power loss.

To combat this problem, some power converters partially bypass the second conversion stage. In cases where the −48 V output is highly loaded, this voltage is supplied directly from the AC/DC converter in the first stage when commercial AC power is available. As with the previous converter, when commercial AC power fails, the −48 V is supplied to the output from the battery by way of the third stage DC/DC converter. While this configuration allows only one converter to be used at any time for the −48 V output, unacceptable inefficiencies still exist for the remaining outputs.

Finally, another major disadvantage to either of the configurations shown relates to costs associated with employing a DC/DC converter in the second stage. The addition of an supplementary transformer in the system (i.e., in the DC/DC converter) greatly increases the costs in building and maintaining this system. Unfortunately, such a converter is necessary to ensure properly conditioned voltages at the various outputs.

Accordingly, what is needed in the art is a power supply and a method of supplying power that employs a single transformer capable of overcoming the above-described deficiencies.

SUMMARY OF THE INVENTION

To address the above-discussed deficiencies of the prior art, the present invention provides a power supply and a method of supplying power to, for example, an optical network. In one embodiment, the power supply includes: (1) a transformer having a main power primary winding, an auxiliary power winding and a secondary winding, (2) a first controllable switch coupled to the main power primary winding that, in response to a first control signal, configures the main power primary winding to receive main DC power, (3) a second controllable switch coupled to the auxiliary power winding that, in response to a second control signal, configures the auxiliary power winding to receive auxiliary DC power and (4) an integrated controller, coupled to the secondary winding, that controls the first and second controllable switches in a current mode and as a function of a voltage of the secondary winding and a presence of the main DC power.

The present invention therefore introduces unified power supply in which conversion of both main and auxiliary power is carried out in a single transformer, thereby eliminating a need for multiple converter stages. In a similar manner, control of the power supply is integrated into a single controller.

In one embodiment of the present invention, the power supply further includes first and second buck regulators, coupled to the auxiliary power winding, that provide DC power at first and second voltages, respectively. The buck regulators, which are not necessary to the broad scope of the present invention, provide DC power at +5 and +3.3 volts, respectively, in the embodiment to be illustrated and described.

In one embodiment of the present invention, the secondary winding provides DC power at a first voltage and the transformer comprises a second secondary winding that provides DC power at a second voltage. In the embodiment to be illustrated and described, the power supply derives two outputs directly from the transformer. The first output provides a first voltage of about −14 volts and the second output (provided by the second secondary winding) provides a second voltage of about −48 volts.

In one embodiment of the present invention, the power supply further includes first and second diodes, series coupled with the first and second controllable switches, respectively, that reduce reverse currents therethrough. Ideally, the first and second diodes prevent the reverse currents from flowing through the first and second controllable switches altogether, thereby increasing power supply efficiency and protecting the first and second controllable switches from harm. The controllable switches contain parasitic parallel diodes where reverse current can flow. The included diode prohibits the reverse current through the controllable switches. The diode also introduces a voltage drop that may reduce the efficiency of the power supply, but such reduction in efficiency should be inconsequential in many applications.

In one embodiment of the present invention, the integrated controller employs a common voltage reference in developing the first and second control signals. The common voltage reference, provided in the embodiment to be illustrated and described by a resistor divider, ensuring that the first and second control signals are controlled reliably relative to one another.

In one embodiment of the present invention, the power supply further includes: (1) a battery, coupled to the second controllable switch, that provides the auxiliary DC power and (2) a charge controller, coupled to the secondary winding, that provides DC power to charge the battery. The power supply can therefore accomplish battery charging, advantageously only while the main DC power is present.

In one embodiment of the present invention, the power supply further includes a main DC power decoupler, coupled to the first controllable switch, that opens the first controllable switch when the main DC power is absent. The main DC power decoupler, which may be little more than a single switch, prevents the main power primary winding from leaking power to mains coupled thereto when main DC power is absent.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
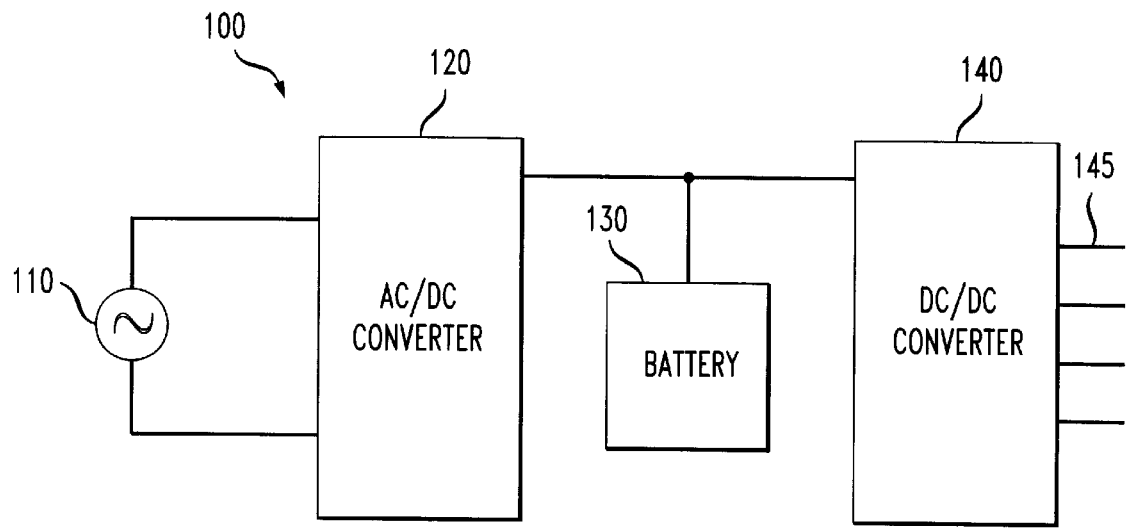
FIGS. 1A and 1B illustrate schematic diagrams of prior art power supplies.
Figure 1B:
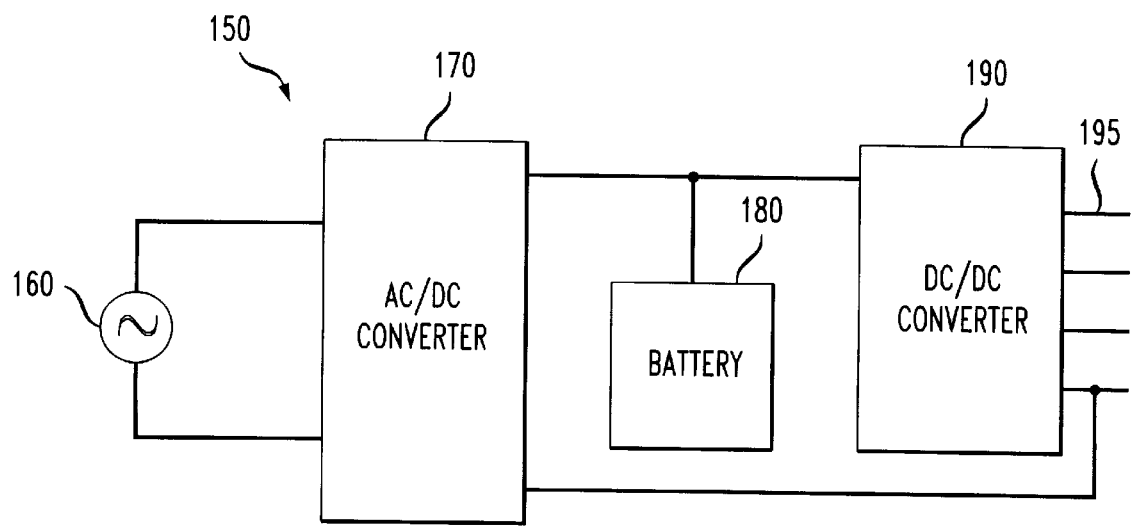

Referring initially to FIGS. 1A and 1B, illustrated are schematic diagrams of prior art power supplies. In FIG. 1A, a power supply, generally designated 100 receives AC power from an AC main power source 110, commonly referred to as "mains." The AC main power source 110 is coupled to an AC/DC converter 120 that converts the supplied AC power into DC power for use by a load (not shown). The AC/DC converter 120 is further coupled to a battery 130 and a DC/DC converter 140. The AC/DC converter 120 continually charges the battery 130. The battery 130 is used as a power back-up when power from the AC main power source 110 fails.

The DC/DC converter 140 conditions the power received from the AC/DC converter 120 and delivers that conditioned power to a plurality of outputs (one of which designated 145) that supply various voltages as required by components with a circuit (not shown). Common values for the outputs in commercially advantageous embodiments include +5 V, +3 V and −48 V.

The main disadvantage to this design is brought about by the use of multiple converters. When a voltage is converted, whether AC-to-DC or DC-to-DC, a portion is lost to inefficiency. Where multiple converters are employed, conversion inefficiency substantially increases.

FIG. 1B shows a diagram of another prior art power supply, generally designated 150, that is similar to that shown in FIG. 1A. In the prior art power supply 150, when the output 195 that supplies −48 V is highly loaded, the AC/DC converter 170 actually supplies the necessary output voltage while the AC power supply 160 is active. If the AC power supply 160 fails, the DC/DC converter, by way of the battery 180, supplies the necessary −48 V. This configuration actually increases the conversion efficiency, since only one converter is employed for the −48 V whether the AC power supply 160 is active or inactive.

The primary disadvantage of both prior art power supplies 100, 150 is the necessary use of multiple transformers, which translates directly into high manufacturing costs. The cost of the power supplies 100, 150 is greater than that of a power supply containing only a single transformer. The present invention is directed, in part, to avoiding the need for multiple transformers.

Figure 2:
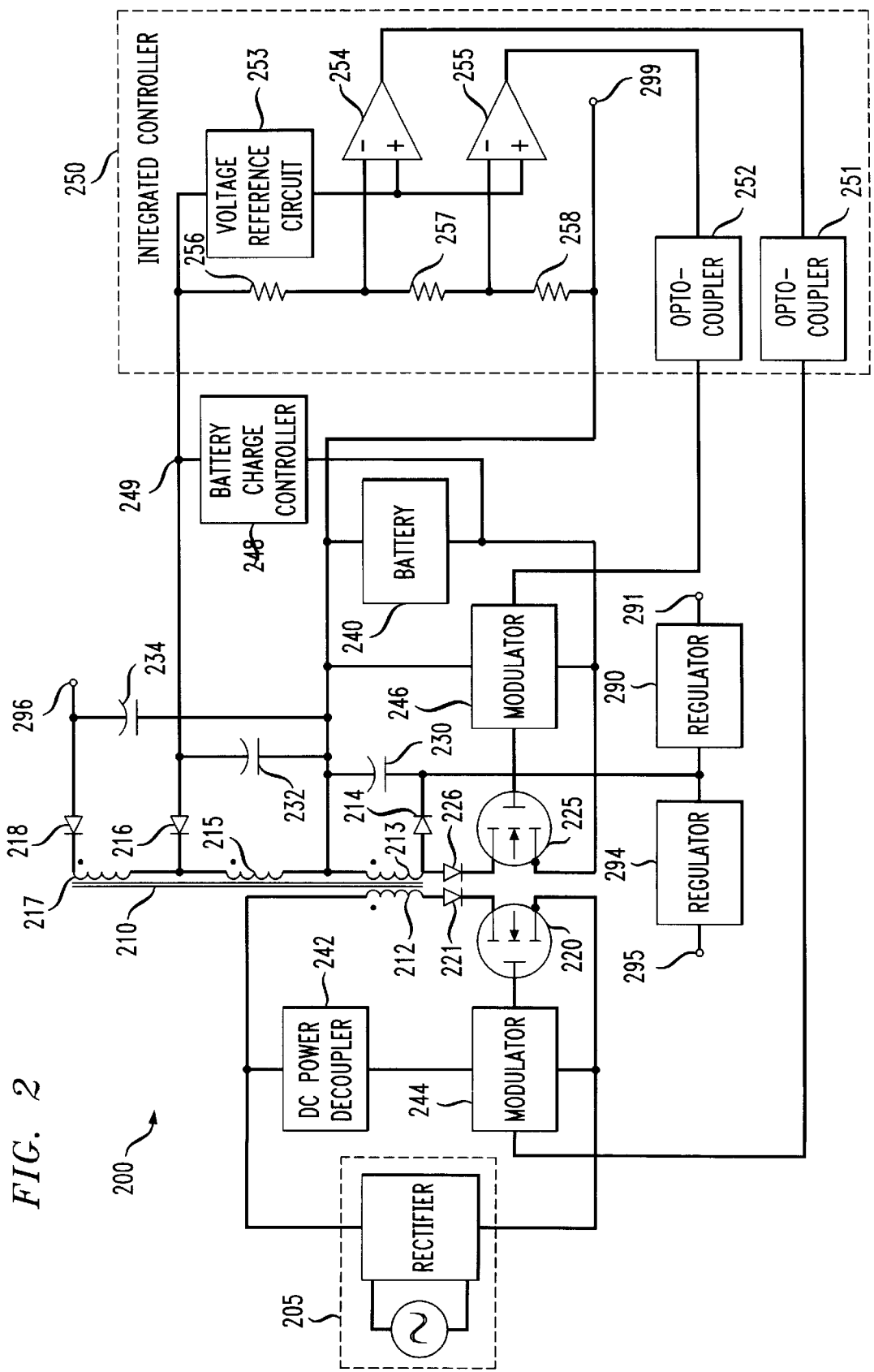
FIG. 2 illustrates a schematic diagram of a power supply constructed according to the principles of the present invention.

Turning now to FIG. 2, illustrated is a schematic diagram of a power supply constructed according to the principles of the present invention. The power supply 200 includes a converter having a single transformer 210.

The single transformer 210 contains a main power primary winding 212, an auxiliary power winding 213, a first secondary winding 215 and a second secondary winding 217. The two primary windings 212, 213 interact with an AC power source/AC-DC converter 205 and with a battery 240, respectively, while the secondary windings 215, 217 function to charge the battery 240 and deliver a voltage to a third voltage output 296, respectively.

The primary power primary winding 212 is coupled to, and receives power from, the AC power source/AC-DC converter 205. A first diode 221 is coupled to the main power primary winding 212 and is further series-coupled to a first controllable switch 220. The first controllable switch 220 is, in turn, coupled to the AC power source/AC-DC converter 205. The first controllable switch 220 is controlled by a first modulator 244 (which may be a pulse-width modulator (PWM)) which, in turn, receives power and control information from an integrated controller 250. In addition, a main DC power decoupler 242 monitors the output of the AC power source/AC-DC converter 205 and decouples the first controllable switch 220 when the AC power source/AC-DC conveter 205 fails.

The auxiliary power winding 213 is coupled to the battery 240 and to a second diode 226 that is further series-coupled to a second controllable switch 225. The second controllable switch 225 is, in turn, coupled to the battery 240. The second controllable switch 225 is coupled to and controlled by a second modulator 246 (which may also be a PWM), which, in turn, receives power and control information from the integrated controller 250.

Additionally, a first rectifying diode 214 and a first capacitor 230 are illustrated as being coupled together across the auxiliary power winding 213. First and second buck regulators 290, 294 are coupled to the first rectifying diode 214 to provide DC power at first and second voltage outputs 291, 295.

The first secondary winding 215 is coupled to the auxiliary power winding 213 to provide a way to charge the battery 240 while the AC power source/AC-DC converter 205 provides power to the power supply 200. A second rectifying diode 216 and a second capacitor 232 are series-coupled across the first secondary winding 215. A battery charge controller 248 is coupled to the second rectifying diode 216 and to the battery 240. The battery charge controller 248 functions to maintain the charge within the battery 240 during time periods when the AC power source/AC-DC converter 205 supplies power to the power supply 200. Finally, a voltage reference node 249 is located between the battery charge controller 248 and the second rectifying diode 216.

The second secondary winding 217 is coupled to the first secondary winding 215 to provide a voltage at the third voltage output 296. In the illustrated embodiment, the voltage supplied at the third voltage 296 output is −48 V. Additionally, the second secondary winding 217 is coupled to a third rectifying diode 218 that is series-coupled to a third capacitor 234 that is further coupled to the auxiliary power winding 213. The third voltage output 296 is located between the third capacitor 234 and the third rectifying diode 218.

The integrated controller 250 is coupled across the second capacitor 232 and sends first and second control signals to the first and second modulators 244, 246, respectively, to control the first and second controllable switches 220, 225. A first, second and third resistors 256, 257, 258 are series-coupled across the second capacitor 232 to form a voltage divider. A voltage return 299, located between the third resistor 258 and the second capacitor 232, is the common or return of the other output voltage within the circuit.

A voltage reference circuit 253 is also coupled to the second capacitor 232 and is further coupled to the noninverting inputs of first and second op-amps 254, 255. The inverting input of the first op-amp 254 is coupled to a node between the first and second resistors 256, 257 and the inverting input of the second op-amp 255 is coupled to a node between the second and third resistors 257, 258.

The outputs of the op-amps 254, 255 are coupled to first and second opto-couplers 251, 252 respectively. The opto-couplers 251, 252 are further coupled to the first and second modulators 244, 246, respectively, to deliver first and second control signals from the integrated controller 250 to control the controllable switches 220, 225 by way of the first and second modulators 244, 246.

During normal operation, the AC power source/AC-DC converter 205 supplies power to the main power primary winding 212 and the first modulator 244 is coupled by the main DC power decoupler 242. The first switch 220 is driven by the first modulator 244 and predetermined voltages appears at the third output 296 and at the voltage reference node 249. The voltage across the first resistor 256 is compared to the voltage of the reference voltage circuit 253. The difference in the measured voltage values is then amplified by the first op-amp 254 and fed back through the first opto-coupler 251 to the first modulator 244 to close the control loop, which results in a stabilizing of the voltage at the voltage reference node 249.

Since the op-amps 254, 255 have substantially the same inputs, the voltage at the inverting input of the second op-amp 255 is higher than its noninverting input. This higher voltage at the inverting input forces the second op-amp 255 to maintain the second modulator 246 at a zero duty cycle, and therefore not drive the second switch 225. During this operation, the second diode 226 inhibits any reverse current attempting to flow through the second switch 225.

In cases where the AC power source/AC-DC converter 205 fails to deliver power to the main power primary winding 212, the first modulator 244 is decoupled by the main DC power decoupler 242. Consequently, the first switch 220 is not driven and the first diode 221 inhibits reverse current flow in the first switch 220. At this point, the second modulator 246 becomes active and drives the second switch 225 in a fashion similar to that described for the first switch 220 during normal operation.

As during normal operation, desired voltage values appears at the third output 296 and at the voltage reference node 249. The voltage value delivered to the inverting input of the second op-amp 255 is slightly lower, because the portion of the voltage that is communicated through the voltage divider to the second op-amp 255, amplified and fed back to the second modulator 246 via the second opto-coupler 252 is larger than during normal operation.

In cases when main AC power fails and the power supply operates from the battery 240, the voltage across the first and second resistors 256, 257 equals the voltage of the voltage reference circuit 253. Thus, the voltage at the voltage reference node 249 while operating under battery power will be less than that while operating from main AC power.

The voltage at the voltage reference node 249 can be calculated from the following equations:

When operating from main AC power:

$$V249 = \frac{R256 + R257 + R258}{R256} * V_{ref}$$

When operating from standby battery power:

$$V249 = \frac{R256 + R257 + R258}{R256 + R257} * V_{ref}$$

where:
V249=voltage at the voltage reference node 249
R256=value of the first resistor 256 ($\Omega$).
R257=value of the second resistor 257 ($\Omega$).
R258=value of the third resistor 258 ($\Omega$).
$V_{ref}$=voltage of the voltage reference circuit 253.

The first and second modulators 244, 246 are illustrated as being current mode controllers which control the currents in the first and second controllable switches 220, 225. When the power supply 200 operates in a normal operating mode and the current in the first switch 220 exceeds a prescribed limit, the voltage at the voltage reference node 249 decreases until the voltage at the inverting input of the second op-amp 255 reaches equilibrium with the voltage at the voltage reference circuit 253. At such time, the second modulator 246 begins driving the second switch 225 and the extra power needed is delivered by the battery 240 through the auxiliary power winding 213.

The maximum current is determined by the first modulator 244 that has a limited duty cycle of 50%. Thus, in a current limited operation, the peak current will be limited to a given value and the duty cycle will be limited to 50%. When current required by the outputs 291, 295, 296, increases, the current through the first controllable switch 220 will rise until the given limit is reached. At such time, the second modulator 246 will compensate for the increased current demands. The second modulator 246 becomes active when the voltage at the voltage reference node 249 has dropped to the control level of the second op-amp and the first modulator 244 attempts to reach its maximum duty cycle.

The extra current required by the outputs is supplied by the battery and controlled by the second modulator 246. Thus, the second modulator 246 controls the current in the second switch 225 in a fashion similar to that in the first modulator 244 and first switch 220. Should the current needed by the outputs rise to an unacceptable level, the current in the second switch 225 will be limited as that in the first switch 220.

Although the present invention has been described in detail, those skilled in the art should understand that they can make various changes, substitutions and alterations herein without departing from the spirit and scope of the invention in its broadest form.

What is claimed is:

1. A power supply, comprising:
   a single transformer having a main power primary winding, an auxiliary power winding and a secondary winding;
   a first controllable switch coupled to said main power primary winding that, in response to a first control signal, configures said main power primary winding to receive main DC power;
   a second controllable switch coupled to said auxiliary power winding that, in response to a second control signal, configures said auxiliary power winding to receive auxiliary DC power; and
   an integrated controller, coupled to said secondary winding, that controls said first and second controllable switches in a current mode and as a function of a voltage of said secondary winding and a presence of said main DC power.

2. The power supply as recited in claim 1 further comprising first and second buck regulators, coupled to said auxiliary power winding, that provide DC power at first and second voltages, respectively.

3. The power supply as recited in claim 1 wherein said secondary winding provides DC power at a first voltage and said transformer comprises a second secondary winding that provides DC power at a second voltage.

4. The power supply as recited in claim 1 further comprising first and second diodes, series coupled with said first and second controllable switches, respectively, that reduce reverse currents therethrough.

5. The power supply as recited in claim 1 wherein said integrated controller employs a common voltage reference in developing said first and second control signals.

6. The power supply as recited in claim 1 further comprising:
   a battery, coupled to said second controllable switch, that provides said auxiliary DC power; and
   a charge controller, coupled to said secondary winding, that provides DC power to charge said battery.

7. The power supply as recited in claim 1 further comprising a main DC power decoupler, coupled to said first controllable switch, that opens said first controllable switch when said main DC power is absent.

8. A method of supplying power, comprising:
   coupling a first controllable switch to a main power primary winding of a single transformer, said first controllable switch configuring said main power primary winding to receive main DC power in response to a first control signal;
   coupling a second controllable switch to an auxiliary power winding of said transformer, said second controllable switch configuring said auxiliary power winding to receive auxiliary DC power in response to a second control signal; and
   controlling said first and second controllable switches in a current mode and as a function of a voltage of a secondary winding of said transformer and a presence of said main DC power.

9. The method as recited in claim 8 further comprising first and second buck regulators, coupled to said auxiliary power winding, that provide DC power at first and second voltages, respectively.

10. The method as recited in claim 8 wherein said secondary winding provides DC power at a first voltage and said transformer comprises a second secondary winding that provides DC power at a second voltage.

11. The method as recited in claim 8 further comprising first and second diodes, series coupled with said first and second controllable switches, respectively, that reduce reverse currents therethrough.

12. The method as recited in claim 8 wherein said integrated controller employs a common voltage reference in developing said first and second control signals.

13. The method as recited in claim 8 further comprising:
   a battery, coupled to said second controllable switch, that provides said auxiliary DC power; and
   a charge controller, coupled to said secondary winding, that provides DC power to charge said battery.

14. The method as recited in claim 8 further comprising a main DC power decoupler, coupled to said first controllable switch, that opens said first controllable switch when said main DC power is absent.

15. A power supply, comprising:
   a single transformer having a main power primary winding, an auxiliary power winding and first and second secondary windings;
   a first controllable switch coupled to said main power primary winding that, in response to a first control signal, configures said main power primary winding to receive main DC power;
   a battery;
   a second controllable switch coupled to said auxiliary power winding and said battery that, in response to a second control signal, configures said auxiliary power winding to receive auxiliary DC power from said battery; and
   an integrated controller, coupled to said secondary winding, that controls said first and second controllable switches in a current mode and as a function of a voltage of a selected one of said first and second secondary windings and a presence of said main DC power.

16. The power supply as recited in claim 15 further comprising first and second buck regulators, coupled to said auxiliary power winding, that provide DC power at first and second positive voltages, respectively.

17. The power supply as recited in claim 15 further comprising first and second diodes, series coupled with said first and second controllable switches, respectively, that reduce reverse currents therethrough.

18. The power supply as recited in claim 15 wherein said integrated controller employs a common voltage reference in developing said first and second control signals.

19. The power supply as recited in claim 15 further comprising a charge controller that provides DC power to charge said battery.

20. The power supply as recited in claim 15 further comprising a main DC power decoupler, coupled to said first controllable switch, that opens said first controllable switch when said main DC power is absent.

* * * * *